Jan. 27, 1931.  M. CSONTOS ET AL  1,790,575
ANIMAL TRAP
Filed April 11, 1930  3 Sheets-Sheet 1
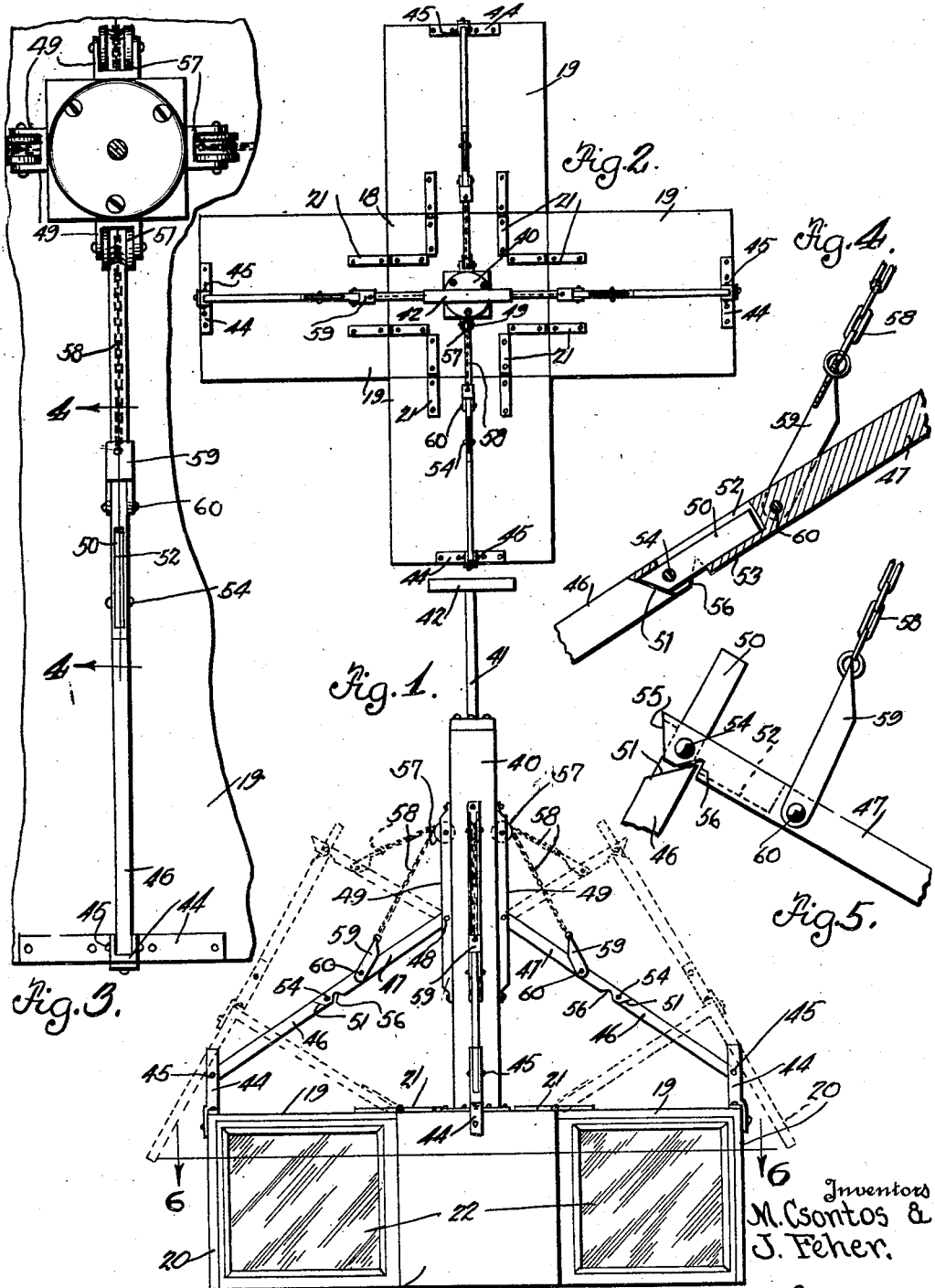

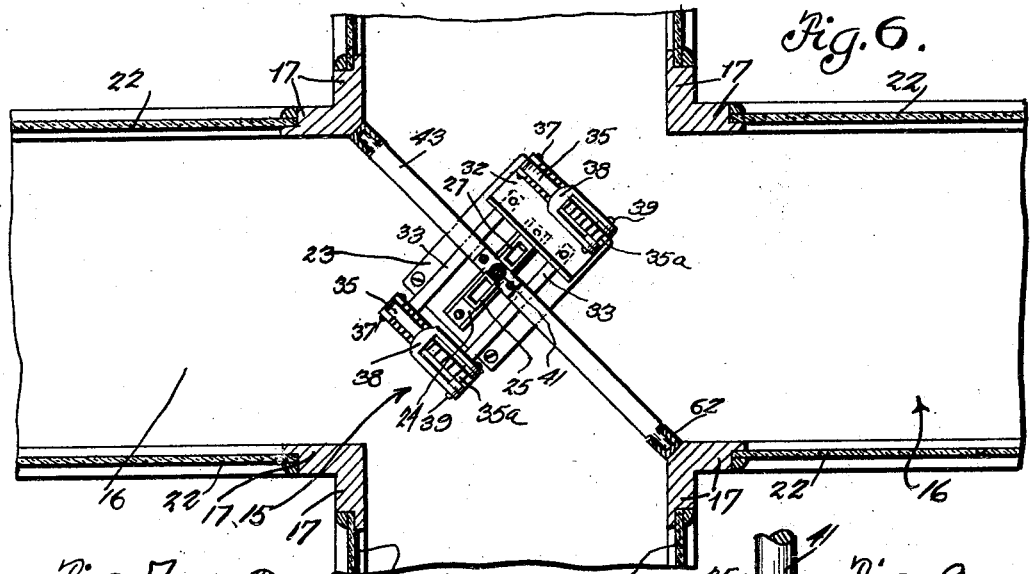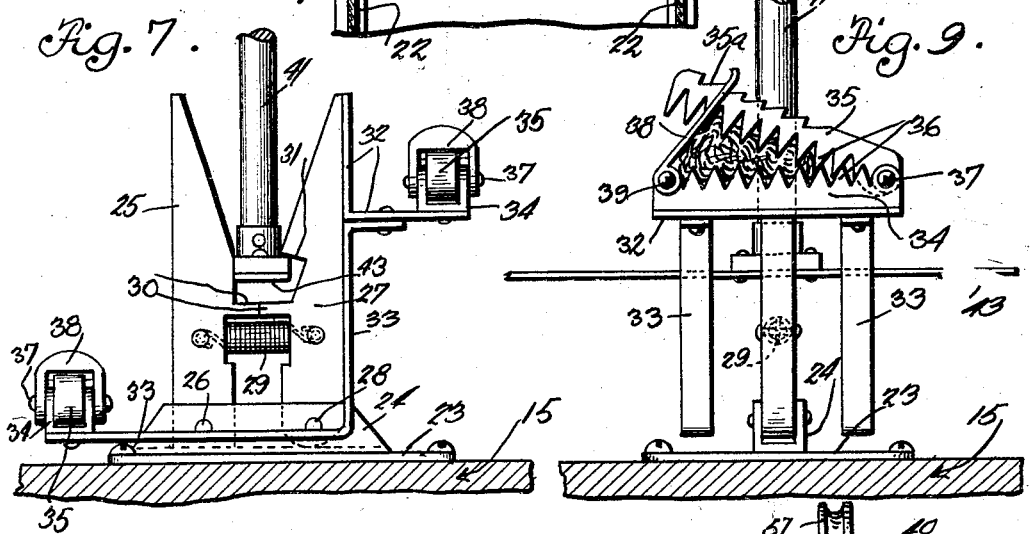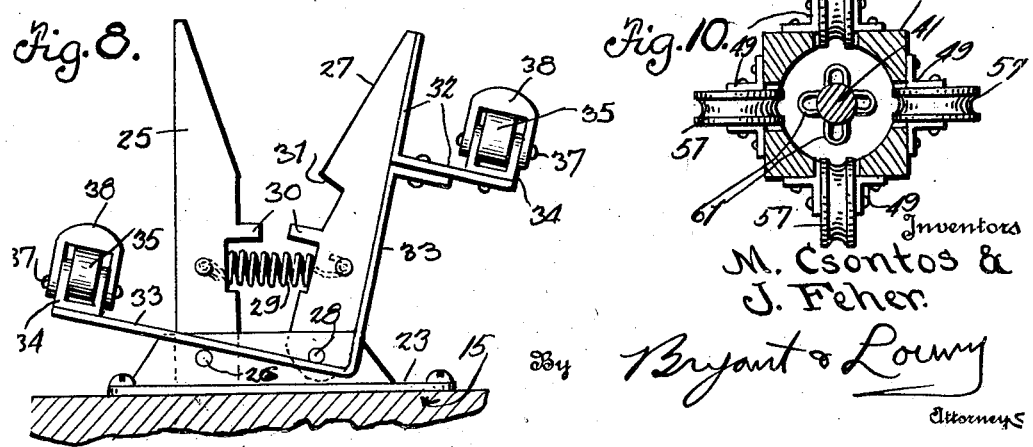

Jan. 27, 1931.  M. CSONTOS ET AL  1,790,575
ANIMAL TRAP
Filed April 11, 1930   3 Sheets-Sheet 3
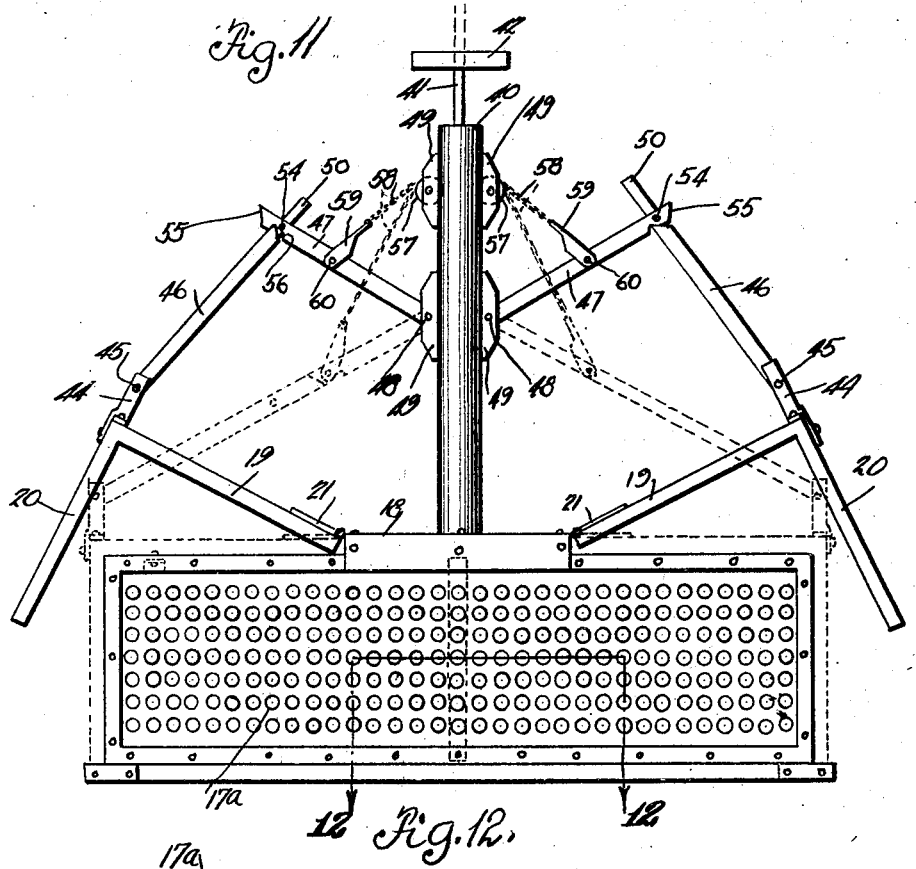
Inventors
M. Csontos &
J. Feher.
By Bryant & Lowry
Attorneys Patented Jan. 27, 1931

1,790,575

UNITED STATES PATENT OFFICE

MIKE CSONTOS AND JOSEPH FEHÉR, OF NEW YORK, N. Y.

ANIMAL TRAP

Application filed April 11, 1930. Serial No. 443,483.

This invention relates to certain new and useful improvements in animal traps.

The primary object of the invention is to provide an animal trap wherein the animal is caught and retained in a live condition and is intended for various uses, such as in extermination of rodents from buildings as well as for use by hunters for the trapping of animals.

A further object of the invention is to provide an animal trap of the type in which the animal is trapped and retained in a live condition with the novel form of link devices associated with the trap doors which will prevent accidental opening of the doors when in closed position and to be manually operable for readily releasing the doors for removal of the trapped animals.

A further object of the invention is to provide an animal trap of the foregoing type with a novel form of bait holder that cooperates with a latch device for retaining the trap doors in open position, the invention further embodying a casing structure with which any desired number of trap doors may be associated, and which may be constructed of sheet material, such as wood or metal with transparent windows in the sides of the entrance passages to the casing, or the casing structure may be formed from a metallic latticed or grille work for clear vision of the entire interior area of the trap.

With the above and other objects in view that will become apparent as the nature of the invention is better understood, the same consists of the novel construction, combination and arrangement of parts to be hereinafter more fully described and then claimed.

In the accompanying drawings forming a part of this application and to which reference is had by like reference characters designating corresponding parts throughout the several views;

Figure 1 is a side elevational view of an animal trap constructed in accordance with the present invention embodying four trap doors, the latter being illustrated by dotted lines in their raised set positions, Figure 2 is a top plan view of the trap shown in Figure 1, Figure 3 is a fragmentary top plan view showing the hoist chains connected to the link devices on the trap doors, Figure 4 is a detailed sectional view taken on line 4—4 of Figure 3 showing the pivotal connection between adjacent ends of the trap door links.

Figure 5 is a fragmentary side elevational view showing the position assumed by the links when the trap door is in set position, Figure 6 is a horizontal sectional view taken on line 6—6 of Figure 1 showing the bait holder disposed centrally of the trap casing and the cross latch arm of the control rod having its ends movable in vertical guides, Figure 7 is a fragmentary end elevational view of the combined bait holder and latch, Figure 8 is an end elevational view, similar to Figure 7 showing the bait holder and latch moved to releasing position, Figure 9 is a side elevational view of the bait holder and latch showing the novel form of bait holder, Figure 10 is a detailed sectional view showing the standard above the trap casing in which the control rod is reciprocable with the guide pulleys on the standard for the trap door hoist chains, Figure 11 is a side elevational view in which the trap casing embodies two entrance openings and wherein the side walls of the casing are formed of grille work, and Figure 12 is an enlarged detailed sectional view taken on line 12—12 of Figure 11.

Referring more in detail to the accompanying drawings and particularly to Figures 1 to 10, there is illustrated an animal trap having four entrance openings controlled by trap doors, while in Figure 11 the device embodies two openings controlled by trap doors, it being understood that the trap may be constructed to embody any preferred number of entrance openings. As shown in Figures 1 to 10, the animal trap embodies a central bottom portion 15 with bottom portions 16 radiating therefrom with perpendicular side walls 17 and a fixed central top wall 18 overlying the bottom wall 15, the casing structure of the trap being completed by trap doors embodying top walls 19 and end walls 20 associated with the side walls 17 to form complete closures for the trap. The inner ends of the top walls 19 are hinged as at 21 to the adjacent edges of the central top wall 18 as shown in Figure 2 while the side walls 17 are each provided with a transparent window 22 to permit inspection of the interior of the trap casing.

A combined bait holder and latch is arranged centrally of the bottom 15 of the trap casing and embodies a mounting plate 23 secured to the bottom plate and carrying a pair of upstanding ribs 24 as shown in Figures 7 to 9. A vertical abutment arm 25 is anchored at its lower end as 26 between the ribs 24 at one end thereof while a latch arm 27 opposed to the abutment arm 25 is pivotally mounted as at 28 between the opposite ribs 24. The latch arm 27 is influenced in movement toward the abutment arm 25 by the spring 29 connecting the arms, this movement being limited by the cooperating abutment fingers 30 on both arms. The latch arm 27 is provided with a latch lug 31 for purposes presently to appear. An angle plate 32 attached to the upper end of the latch arm 27 supports a bait holder while a pair of angle arms 33 secured to the angle iron 32 and latch arm 27 extend to the opposite side of the mounting plate 23 outwardly of the abutment arm 25 for the support of a bait holder. Each bait holder comprises a pair of gripping jaws 34 and 35 having cooperating serrated edges 36 for the positive gripping of the bait, the gripping jaws being pivotally connected together at one end as at 37, while a U-shaped closure strap 38 for the jaws has its free ends pivoted as at 39 upon the jaw 34 with its closed end inclosing the free swinging end of the jaw 35 for engagement with the ratchet teeth 35ª upon the upper side of the jaw 35. With this construction the bait is securely retained in position.

A hollow standard 40 rises centrally from the top wall 18 of the trap casing while a control rod 41 having a handle 42 upon its upper end is reciprocable in the standard, the lower end of the control rod 41 extending into the trap casing and carrying at its lower end, a transverse latch arm 43 which is adapted to be depressed between the abutment arm 25 and latch arm 27 to be engaged by the latch lug 31 as shown in Figure 7. The trap doors have a link connection with the hollow standard 40 and a chain connection is established between the links and control rod 41. An arm 44 rising vertically from the outer edge of the top wall 19 of the trap door has pivotally connected thereto as at 45, one end of a link 46 while a second link 47 is pivotally connected at 48 within a vertical channel guide 49 carried by the adjacent side of the standard 40. The connection between the adjacent ends 46 and 47 is shown more clearly in Figures 4 and 5, the link 46 having a stem extension 50 and an angle shoulder 51 at each side of the stem, the stem extending into a cutout portion 52 in the adjacent end of the link 47, the cutout portion 52 being opened at its upper side and closed at its lower side as at 53, the stem being pivotally mounted between the side wall portions of the cutout as at 54. The end of the link 47 is formed at an angle as at 55 to engage the angle shoulder 51 upon the link 46 when the two links are alined as shown in Figure 4 while the lower side of the link 47 adjacent the pivot pin 54 is provided with a V-shaped notch 56 to receive the forward ends of the angle shoulders 51 when the links assume the position shown in Figure 5.

As shown in Figures 1, 3 and 10, a guide pulley 57 is journaled adjacent the upper end of each channel guide 49 and over which a chain 58 passes, one end of the chain being attached to the arm 59 that is pivoted as at 60 to the link 47 adjacent its connection with the link 46 while the other end of the chain is attached to an eye 61 upon the control rod 41 within the hollow standard 40.

When the trap doors are in their lowered closed positions as shown by full lines in Figure 1, the links 46 and 47 are alined with each other and upward movement of the trap doors to open position is prevented in view of the abutting ends of the cooperating links. To open the trap doors or move the latter to set positions, the operating rod 41 is depressed and during such movement, a pull is exerted upon the chains 58 to raise the outer end of the link 47 to move the same upon its pivotal mounting 48 of the standard 40 and simultaneously to raise the link 46 and trap door attached thereto. During the lowering movement of the rod 41, the cross latch arm 43 upon the lower end thereof is moved downwardly between the abutment arm 25 and latch arm 27 to move the latter against the tension of the spring 29 and to position the latch arm 43 for automatic engagement by the latch lug 31 upon the latch arm 27, the control rod then being retained in its lowered position with the trap doors elevated to their set positions. Movement of the latch arm 27 by an animal attacking the bait in the bait holder, one of the bait holders being lowered and the other raised, will disengage itself from the latch arm 43 whereupon the latter will be raised and the trap doors gravitationally lowered to closed positions and there locked by the alining of the cooperating links 46 and 47. The latch arm 43 while carried by the freely movable control rod 41 is prevented from rotary movement in a horizontal plane to insure proper positioning thereof relative to the abutment arm 25 by the provision of vertically disposed channel guides 62 carried by the corner walls 17 of the cap casing as shown in Figure 6 and into which channel guides the ends of the latch arm 43 freely extend. The latch arm 43 is guided in its vertical movements by the channel guides and is positioned at all times to be engaged by the latch arm 27 when the same is lowered for the setting of the trap doors. As previously stated, the trap casing may be constructed of any preferred material, such as wood or cheap metal and the side walls 17 of the entrance passages may have transparent windows therein for a visual inspection of the interior of the trap when the trap doors are lowered and in locked position.

While it has been stated that the animal trap may be constructed or designed with any number of entrance openings and trap doors desired, another form of trap is illustrated in Figures 11 and 12 wherein the device embodies a trap casing of elongated form having a trap door at each end thereof. The trap doors and operating links in this form of the invention are the same as disclosed in connection with Figures 1 to 10 with the exception of the side walls 17ª being formed of latticed or reticulated sheet material providing a ventilating feature for the trap as well as permitting visual inspection of the interior thereof. It is to be understood that the animal trap may be constructed of any preferred material and varied as to size.

While there are herein shown and described the preferred embodiments of the invention, it is to be understood that minor changes may be made in the details of construction thereof, such as will fall within the scope of the subject matter claimed.

We claim:

1. In an animal trap, a casing having entrance openings, a trap door for each opening hinged on the casing, a combined bait holder and latch within the casing and connections between the bait holder and latch, and the trap doors, including link members alined when the trap doors are closed for so holding them and a manually operable chain for moving the link members to permit opening movement of the trap doors.

2. In an animal trap, a casing having entrance openings, a trap door for each opening hinged on the casing, a combined bait holder and latch within the casing and connections between the bait holder and latch, and the trap doors, including link members alined when the trap doors are closed for so holding them and a manually operable chain for moving the link members to permit opening movement of the trap doors, and a vertically shiftable rod to which the chains are attached having a latch arm on its lower end adapted to be engaged with the combined bait holder and latch.

3. In an animal trap of the character described, a casing having entrance openings, a trap door for each opening, and a combined bait holder and latch within the casing operatively engaged with the trap doors, the bait holder and latch comprising a pivotal latch lever with gripping jaws on opposite sides of the pivot points.

4. In an animal trap of the character described, a casing having entrance openings, a trap door for each opening, a combined bait holder and latch within the casing operatively engaged with the trap doors, the bait holder and latch comprising a pivotal latch lever with gripping jaws on opposite sides of the pivot points, said jaws being hinged together and having impalement teeth and a strap for holding the jaws in closed position.

5. In an animal trap of the character described, a casing having entrance openings and trap doors, a central shaft vertically movable in the casing and extending above the same, a standard on the casing through which the shaft extends, pivoted connected links pivotally attached at their outer ends to each trap door and standard and adapted when alined to hold the doors in closed position, a chain connection between each inner link and shaft and a combined bait holder and latch within the casing to be engaged by the lower end of the shaft.

6. In an animal trap of the character described, a casing having entrance openings and trap doors, a central shaft vertically movable in the casing and extending above the same, a standard on the casing through which the shaft extends, pivoted connected links pivotally attached at their outer ends to each trap door and standard and adapted when alined to hold the doors in closed position, a chain connection between each inner link and shaft, a combined bait holder and latch within the casing to be engaged by the lower end of the shaft, and including an abutment arm and a cooperating pivoted latch arm with which the lower end of the shaft is engaged.

7. In an animal trap of the character described, a casing having entrance openings and trap doors, a central shaft vertically movable in the casing and extending above the same, a standard on the casing through which the shaft extends, pivoted connected links pivotally attached at their outer ends to each trap door and standard and adapted when alined to hold the doors in closed position, a chain connection between each inner link and shaft, a combined bait holder and latch within the casing to be engaged by the lower end of the shaft, including an abutment arm and a cooperating pivoted latch arm with which the lower end of the shaft is engaged and a bait gripping jaw mounted on each side of the pivoted latch arm.

8. In an animal trap of the character described, a casing having entrance openings and trap doors, a central shaft vertically movable in the casing and extending above the same, a standard on the casing through which the shaft extends, pivotally connected links pivotally attached at their outer ends to each trap door and standard and adapted when alined to hold the doors in closed position, a chain connection between each inner link and shaft, a cross latch arm on the lower end of the shaft and a combined bait holder and latch within the casing to be engaged by the cross latch arm.

9. In an animal trap of the character described, a casing having entrance openings and trap doors, a central shaft vertically movable in the casing and extending above the same, a standard on the casing through which the shaft extends, pivotally connected links pivotally attached at their outer ends to each trap door and standard and adapted when alined to hold the doors in closed position, a chain connection between each inner link and shaft, a cross latch arm on the lower end of the shaft, a combined bait holder and latch within the casing to be engaged by the cross latch arm and including an abutment arm and a tensioned cooperating pivoted latch arm with which the cross latch arm is engaged.

10. In an animal trap of the character described, a casing having entrance openings and trap doors of angle formation for closing the openings, a hollow standard in the casing, a vertically shiftable rod in the standard, a combined bait holder and latch in the casing to be engaged by the lower end of the rod, a pair of pivotally connected links pivoted at their ends to each trap door and standard and a flexible connection between the inner link of each pair and the rod.

11. In an animal trap of the character described, a casing having entrance openings and trap doors of angle formation for closing the openings, a hollow standard in the casing, a vertically shiftable rod in the standard, a combined bait holder and latch in the casing to be engaged by the lower end of the rod, a pair of pivotally connected links pivoted at their ends to each trap door and standard and a flexible connection between the inner link of each pair and the rod, the connection between each pair of links including an arm extension on one link and a cutaway portion in the other link in which the arm extension is received.

12. In an animal trap of the character described, a casing having entrance openings and trap doors of angle formation for closing the openings, a hollow standard in the casing, a vertically shiftable rod in the standard, a combined bait holder and latch in the casing to be engaged by the lower end of the rod, a pair of pivotally connected links pivoted at their ends to each trap door and standard, a flexible connection between the inner link of each pair and the rod, the connection between each pair of links including an arm extension on one link and a cutaway portion in the other link in which the arm extension is received, and abutting shoulders on the adjacent ends of the links to limit movement of the links in closing movements of the door for alining the links to hold the door in closed position.

In testimony whereof we affix our signatures.

MIKE CSONTOS.
JOSEPH FEHÉR.